US010620100B2

(12) United States Patent
Lacy et al.

(10) Patent No.: US 10,620,100 B2
(45) Date of Patent: Apr. 14, 2020

(54) NON-CONTACT VELOCITY MEASUREMENT INSTRUMENTS AND SYSTEMS, AND RELATED METHODS

(71) Applicant: Battelle Energy Alliance, LLC, Idaho Falls, ID (US)

(72) Inventors: Jeffrey M. Lacy, Idaho Falls, ID (US); James A. Smith, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 156 days.

(21) Appl. No.: 15/659,396

(22) Filed: Jul. 25, 2017

(65) Prior Publication Data

US 2018/0031459 A1    Feb. 1, 2018

Related U.S. Application Data

(60) Provisional application No. 62/367,015, filed on Jul. 26, 2016.

(51) Int. Cl.
| | |
|---|---|
| *G01N 3/32* | (2006.01) |
| *G01Q 40/02* | (2010.01) |
| *G01N 3/06* | (2006.01) |
| *G01B 5/28* | (2006.01) |
| *B23K 26/356* | (2014.01) |

(52) U.S. Cl.
CPC .............. *G01N 3/32* (2013.01); *B23K 26/356* (2015.10); *G01B 5/28* (2013.01); *G01N 3/06* (2013.01); *G01Q 40/02* (2013.01)

(58) Field of Classification Search
CPC .......... G01N 3/32; G01N 3/06; B23K 26/356; G01Q 40/02; G01B 5/28
See application file for complete search history.

(56) References Cited

U.S. PATENT DOCUMENTS 5,315,364 A * 5/1994 Arion ................. G01H 9/00
                                                    250/227.11
5,346,869 A * 9/1994 Nishioka .............. C04B 35/584
                                                    501/118

(Continued)

FOREIGN PATENT DOCUMENTS

EP    0521233 B1    7/1999

OTHER PUBLICATIONS

Denzel et al., "Determination of Shock Properties of Ceramic Corbit 98: 98% Alumina", Naval Postgraduate School Thesis (Year: 2010).*

(Continued)

*Primary Examiner* — Nathaniel T Woodward
(74) *Attorney, Agent, or Firm* — TraskBritt

(57) ABSTRACT

Methods for calibration of non-contact velocity measurements and systems for implementing the same are described. Generally, the method comprises inducing a shock wave into a sample at a stress intensity that varies across the sample's elastic limit, which corresponds to the elastic-plastic state transition of the sample. That transition state may be at the sample's Hugoniot elastic limit. The velocity of the sample is measured using a non-contact velocity measurement instrument such as a velocimeter. The measurement may be compared to a predicted velocity or a velocity measurement made by another system to determine calibration parameters.

32 Claims, 12 Drawing Sheets

(56) References Cited

U.S. PATENT DOCUMENTS 5,783,297 A * 7/1998 Wise .................. C04B 28/04
  106/605
2009/0173159 A1 * 7/2009 Reed .................. G01L 1/241
  73/649

OTHER PUBLICATIONS

Kennedy et al., "Influence of Microstructural Bias on the Hugoniot Elastic Limit and Spall Strength of Two-Phase $TiB_2\_Al_2O_3$ Ceramics", Shock compression of Condensed Matter (Year: 2001).*

Gebbeken et al., "Equation of State Data for Concrete Determined by Full-Scale Experiements and Flyer-Plate-Impact Tests", European Conference on Computational Mechanics, Cracow, Poland (Jun. 2001), 14 pages.

* cited by examiner

SYSTEM 1
SYSTEM 2
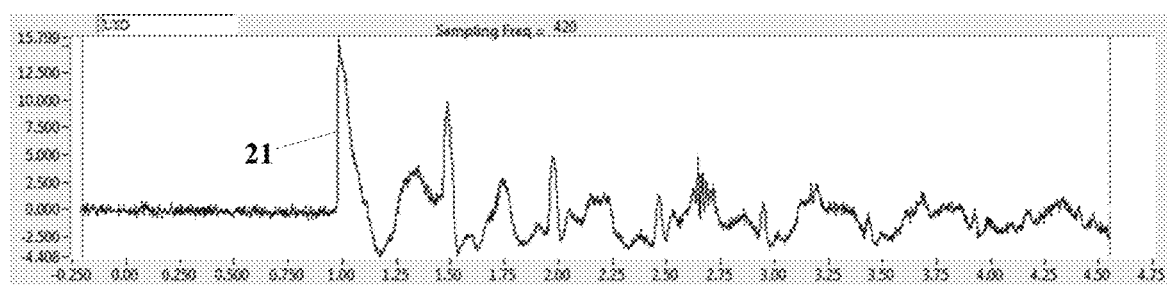
FIGURE 2A
SYSTEM 1
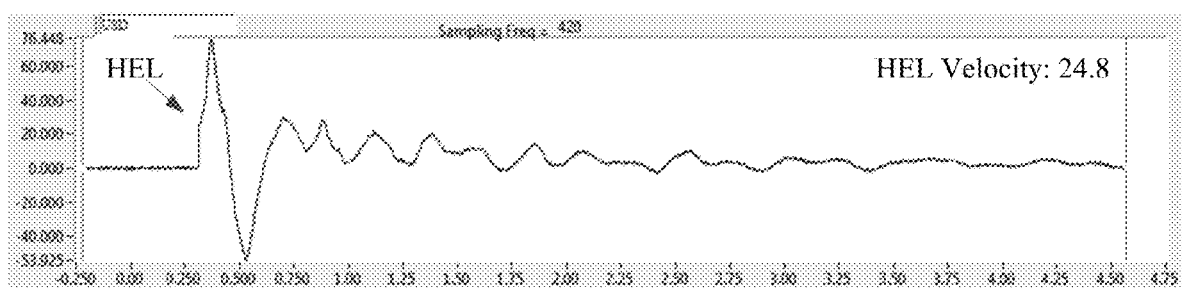
SYSTEM 2
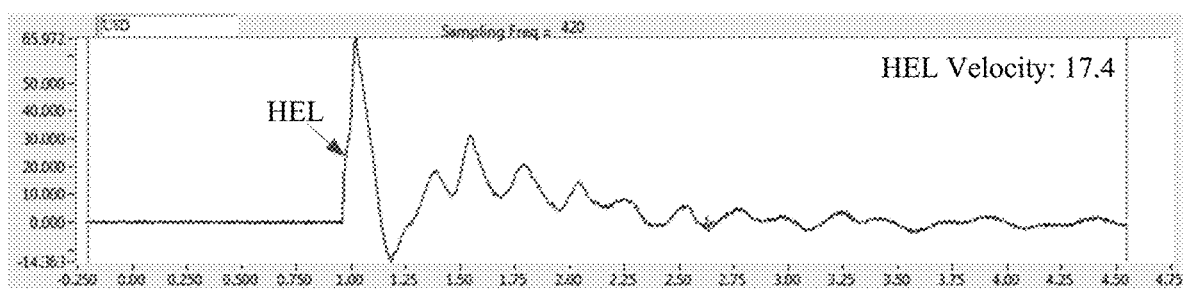
FIGURE 2B SYSTEM 1
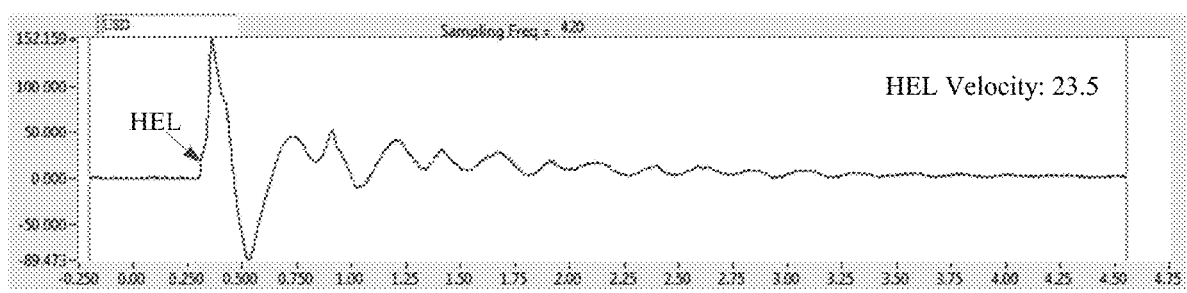
SYSTEM 2
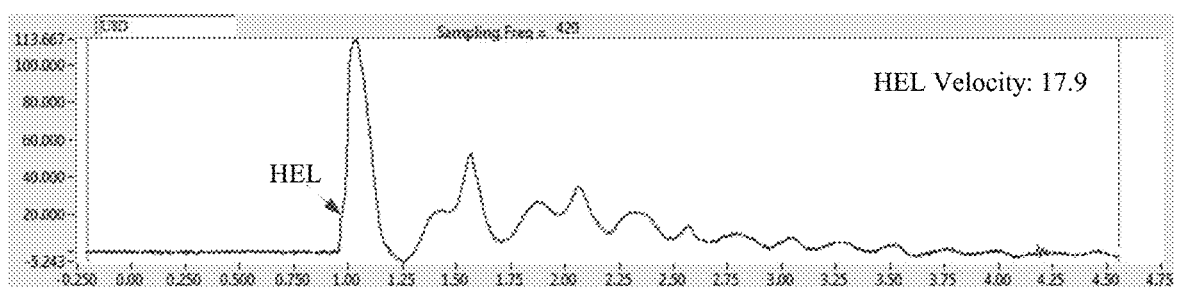
FIGURE 2C

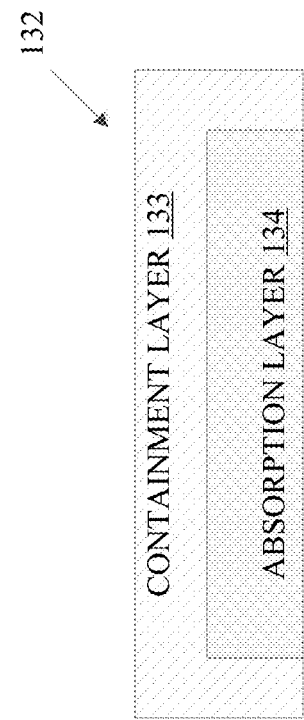
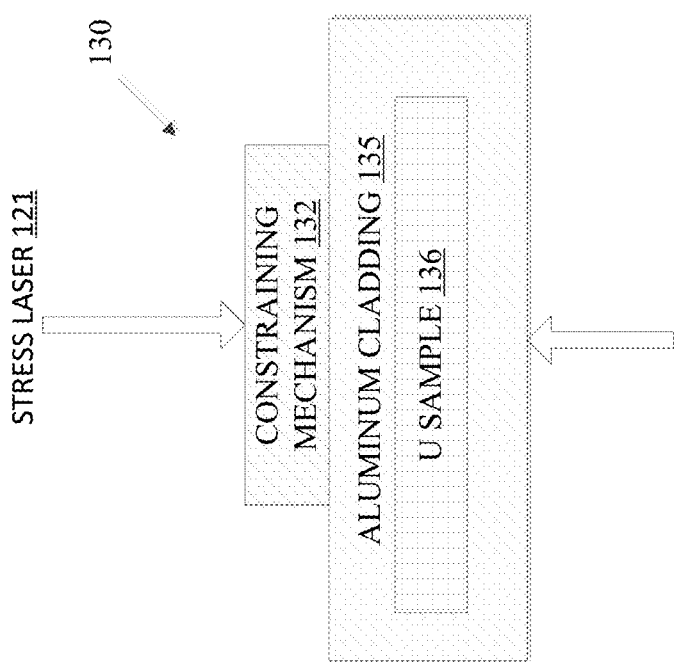
FIGURE 5B
FIGURE 5A

```
┌─────────────────────────────────────────────────────────┐
│   INDUCE A SHOCK WAVE INTO SAMPLE TO STRESS THE SAMPLE AT│
│              OR ABOVE AN ELASTIC LIMIT                  │
│                          211                            │
└─────────────────────────────────────────────────────────┘
                            │
                            ▼
┌─────────────────────────────────────────────────────────┐
│      MEASURE THE VELOCITY ASSOCIATED WITH THE ELASTIC LIMIT│
│             BY A FIRST MEASUREMENT SYSTEM               │
│                          212                            │
└─────────────────────────────────────────────────────────┘
                            │
                            ▼
┌─────────────────────────────────────────────────────────┐
│    COMPARE THE VELOCITY MEASUREMENT TO A SECOND VELOCITY│
│          MEASURED BY A SECOND MEASUREMENT SYSTEM        │
│                          213                            │
└─────────────────────────────────────────────────────────┘
                            │
                            ▼
┌─────────────────────────────────────────────────────────┐
│        DETERMINE CALIBRATION SETTINGS FOR THE FIRST     │
│  MEASUREMENT SYSTEM RESPONSIVE TO THE COMPARISON OF THE │
│    MEASURED VELOCITIES OF THE FIRST AND SECOND SYSTEMS  │
│                          214                            │
└─────────────────────────────────────────────────────────┘
                            │
                            ▼
┌─────────────────────────────────────────────────────────┐
│      DETERMINE A CALIBRATION PARAMETER FOR THE SECOND   │
│  MEASUREMENT SYSTEM RESPONSIVE TO THE COMPARISON OF THE │
│    MEASURED VELOCITIES OF THE FIRST AND SECOND SYSTEMS  │
│                          215                            │
└─────────────────────────────────────────────────────────┘
```

FIGURE 8

NON-CONTACT VELOCITY MEASUREMENT INSTRUMENTS AND SYSTEMS, AND RELATED METHODS

CROSS-REFERENCE TO RELATED APPLICATIONS

This application claims the benefit of U.S. Provisional Patent Application Ser. No. 62/367,015, filed Jul. 26, 2016, the entire contents and disclosure of which is hereby incorporated by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to methods for calibrating non-contact velocity measurement instruments and methods for non-contact velocity measurement.

BACKGROUND

Laser Shockwave Technique (LST), which was developed initially for determining adhesion of thin films and coatings to substrates, a high-energy pulsed laser generates a compressive shock wave at the upper surface of a test sample. The compressive shock traverses the sample. After arriving at a predetermined spot of the test sample, the compressive wave is transformed by the free surface into a tensile wave that traverses back through the specimen. A shock wave with amplitude above an interface defined threshold will generate tensile stresses that can de-bond the film/coating from the substrate. By examining the specimen response and using shock wave propagation models, the stress necessary to de-bond the film/coating from the substrate can be determined.

By way of example, LST is one technique for qualifying fuel that characterizes the clad-clad and fuel-clad relationships.

There are drawbacks and deficiencies with existing techniques for shock wave testing, including LST.

BRIEF SUMMARY

Various embodiments of the disclosure relate, generally, to a method. The method may be used to calibrate a non-contact velocity measurement instrument or system. The method may include inducing a wave into a sample to stress the sample at or above an elastic limit; and measuring a velocity associated with the elastic limit. In one embodiment the elastic limit may be a Hugoniot elastic limit of the sample.

Other embodiments of the disclosure relate, generally, to another method. The method may be used to calibrate a non-contact velocity measurement instrument or system. The method may include inducing a wave into a sample to stress the sample at or above an elastic limit; measuring a velocity associated with the elastic limit by a first measurement system; comparing the measured velocity to a second velocity measured by a second measurement system; and determining one or more calibration parameters for the first measurement system responsive to the comparison. In one embodiment the elastic limit may be a Hugoniot elastic limit of the sample.

Other embodiments may relate, generally, to a system. The system may be used to calibrate a non-contact velocity measurement instrument or system as well as monitor a sample using a non-contact velocity measurement instrument or system. The system may include a stress generation source and a non-contact measurement instrument. The stress generation source may be configured to induce a stress on a sample at or above an elastic limit of the sample. The non-contact measurement instrument may be configured to: measure a velocity of the sample as it is stressed; and compare the measured velocity to a second velocity measurement responsive to the elastic limit of the sample. In one embodiment the elastic limit may be a Hugoniot elastic limit of the sample.

Other embodiments of the disclosure relate, generally, to another method. The method may be used to monitor a sample or material using a non-contact velocity measurement instrument or system. The method may include inducing a wave into a sample to stress the sample at or above an elastic limit; measuring a velocity associated with the elastic limit by a first measurement system; determining an elastic limit of the material responsive to the measured velocity; and determining a mechanical property of the material responsive to the determined elastic limit. In one embodiment the elastic limit may be a Hugoniot elastic limit of the sample.

Other embodiments of the disclosure relate, generally, to a system. The system may include a sample and a monitoring system configured to monitoring the sample. The monitoring system may be configured to monitor the sample by inducing a wave into a sample to stress the sample at or above an elastic limit; measuring a velocity associated with the elastic limit by a first measurement system; determining an elastic limit of the material responsive to the measured velocity; and determining a mechanical property of the material responsive to the determined elastic limit.

Other embodiments of the disclosure relate, generally, to a sample exhibiting a dynamic response. The dynamic response may be characterizable by a waveform having an elastic component, a plastic component, and a transition component between the elastic component and the plastic component.

Other embodiments of the disclosure relate, generally, to another method. The method may include, inducing a dynamic response in a sample. The dynamic response may be characterizable by a waveform having an elastic component, a plastic component, and a transition component between the elastic component and the plastic component.

BRIEF DESCRIPTION OF THE DRAWINGS

Purposes and advantages of the embodiments of the disclosure will be apparent to one of ordinary skill in the art from the detailed description in conjunction with the appended drawings, including:

FIG. 2A is a graph showing entirely elastic behavior in two uncalibrated instruments at an induced intensity of 0.12 J, respectively, in accordance with an embodiment of the disclosure.

FIGS. 2B and 2C show graphs illustrating HEL discontinuities in two uncalibrated instruments at 0.95 J and 2.0 J, respectively, in accordance with an embodiment of the disclosure.

FIG. 5A shows a diagram of a sample prepared to be used to calibrate a non-contact velocity measurement system, in accordance with an embodiment of the disclosure.

FIG. 5B shows a diagram of constraining and absorption mechanisms incorporated onto a sample, in accordance with an embodiment of the disclosure.

FIG. 8 shows a flowchart of a calibration method, in accordance with an embodiment of the disclosure.

DETAILED DESCRIPTION

Figure 1:
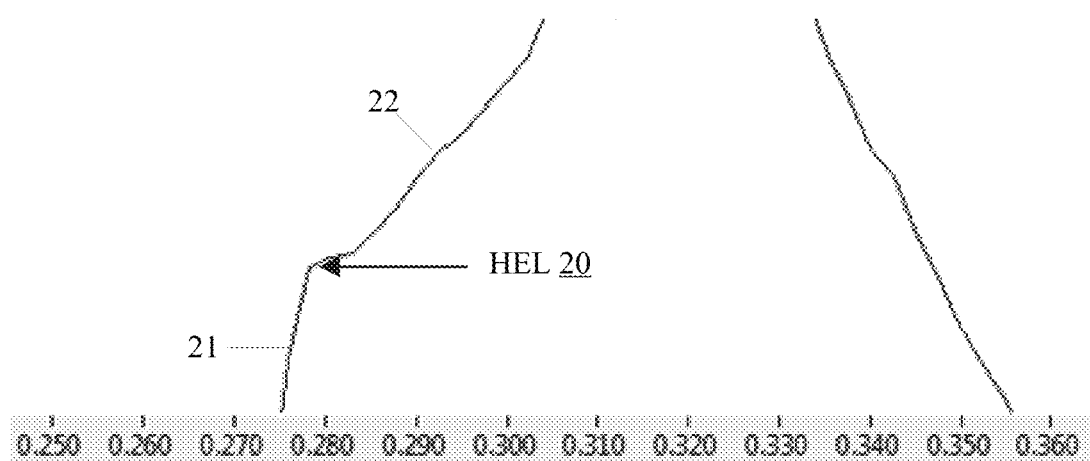
FIG. 1 is a graph showing the identification of the HEL on a back-face velocity trace.

The following description provides specific details to provide a thorough description of various embodiments of the invention. However, one of ordinary skill in the art will understand that the disclosed embodiments may be practiced without using these specific details. Indeed, the disclosed embodiments may be practiced in conjunction with conventional systems and methods used in the industry. In addition, only those elements helpful to understand and enable one of ordinary skill in the art to practice the disclosed embodiments are described in detail. One of ordinary skill in the art will recognize that some elements not described herein but, using various conventional method components and acts, would be in accord with the embodiments of this disclosure.

The following description may include examples to help enable one of ordinary skill in the art to practice the disclosed embodiments. The use of the terms "exemplary," "by example," and "for example," means that the related description is explanatory and though the scope of the disclosure is intended to encompass the recited examples, the use of such terms is not intended to limit the scope of an embodiment or this disclosure to the specified components, steps, features, functions, arrangement of components, steps, features, functions, or the like.

Any drawings accompanying this disclosure are for illustrative purposes only and are not drawn to scale. Elements common among figures may retain the same numerical designation, however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are by way of example only and should not be construed as the only way to implement the present disclosure unless specified otherwise herein. Additionally, block definitions and partitioning of logic between various blocks is/are examples of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Many of the functional units described in this specification may be illustrated, described or labeled as logic, modules, threads, or other segregations of programming code, in order to more particularly emphasize their implementation independence in accomplishing the features, functions, tasks or steps that are generally described herein. The various illustrative logical blocks, modules, and circuits described in connection with the embodiments disclosed herein may be at least partially implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

These logic and modules may also be implemented using software or firmware, stored on a computer-readable storage medium, in system memory, or a combination thereof for execution by various types of processors.

In the case of a general purpose computer, these logic and modules may be embodied in software classes and applications executed by processor cores, and while the modules are executing the general purpose computer may be thought of as a special purpose computer or a specific purpose computer. The logic and modules may also relate to specific purpose hardware, including the firmware and machine code, controlling its operation. An identified module of executable code may, for instance, comprise one or more physical or logical blocks of computer instructions, which may, for instance, be organized as a thread, object, procedure, or function. Nevertheless, the executable code of an identified module need not be physically located together, but may comprise disparate instructions stored in different locations which, when joined logically together, comprise the module and achieve the stated purpose for the module.

A module of executable code may comprise a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software portions, or representations thereof, persist in the same physical location for a period of time. Additionally, in some embodiments, the software portions are stored on one or more non-transitory storage mediums, which include hardware elements capable of storing non-transitory states and/or signals representative of the software portions, even though other portions of the non-transitory storage mediums may be capable of altering and/or transmitting the signals. Examples of non-transitory storage mediums are flash memory and random-access memory (RAM). Another example of a non-transitory storage medium includes a read-only memory (ROM) which can store signals and/or states representative of the software portions for a period of time. However, the ability to store the signals and/or states is not diminished by further functionality of transmitting signals that are the same as, or representative of, the stored signals and/or states. For example, a processor may access the ROM to obtain signals that are representative of the stored signals and/or states in order to execute the corresponding software instructions.

A general-purpose processor (which may also be characterized herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer when the general-purpose computer is configured to execute computing instructions (e.g., software code) related to embodiments of the present disclosure.

The embodiments disclosed herein may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be rearranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Various embodiments described herein may include elements described as implemented in a "workstation," "computer," or a "computer system." Here, the terms "workstation," "computer," and "computer system" are to be understood to include at least one non-transitory computer-readable medium and at least one processing unit. In general, the storage medium will store, at one time or another, at least portions of an executable program code, and the processor(s) will execute one or more of the instructions included in that executable program code. It will be appreciated that the term "executable program code" and the term "software" mean substantially the same thing for the purposes of this description. It is not necessary to the practice of the various embodiments described herein that the storage medium and the processing unit be physically located in the same place. That is to say, it is foreseen that the processor and the memory might be distributed among physical pieces of equipment or even in geographically distinct locations. One of ordinary skill in the art will appreciate that "media," "medium," "storage medium," "computer-readable media," or "computer-readable medium" as used here, may include a diskette, a magnetic tape, a digital tape, a compact disc, an integrated circuit, a ROM, a CD, DVD, Blu-Ray, a cartridge, flash memory, PROM, a RAM, a memory stick or card, or any other non-destructive storage medium useable by computers, including those that are re-writable.

Although the enabling software might be "written on" a disc, "embodied in" an integrated circuit, "carried over" a communications circuit, "stored in" a memory chip, or "loaded in" a cache memory, it will be appreciated that, for the purposes of this disclosure, the software will be referred to simply as being "in" or "on" a main memory that is a computer-readable medium. Thus, the terms "in" or "on" are intended to encompass the above mentioned and all equivalent and possible ways in which software can be associated with a computer-readable medium.

Users may interact with the computer systems described herein by way of graphical user interfaces (GUI) on a display and input devices such as touchscreens, keyboards, a computer mouse, touchpads, buttons, switches, jumpers, and the like. A GUI may include a console and/or dashboard and a user may interact with the GUI and, in turn, underlying software applications.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1).

As used herein, the term "substantially" in reference to a given parameter, property, or condition means and includes, to a degree, that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

It is now understood that any qualification technique that is based on generating a stress wave, by a laser impinging on the plate surface or otherwise, is complex. An amplitude and shape depend on numerous factors relating, for example, to the temporal and spatial distribution of power in the laser spot, surface treatment, and material properties of the plate. Thus, a resulting back-face surface velocity, which may be used to measure the time-varying stress field within the plate, is difficult to reproduce across different measurement systems, and is therefore inappropriate for calibration purposes. Similarly, calibration methods based on a constant-velocity source may be inadequate because they do not produce the same frequency content in the velocity signal and miss frequency-dependent sources of bias. A technique that can generate or indicate known shock intensity independent of the generating conditions would be advantageous, valuable and allow direct comparison of results from different systems.

It is also now understood that among the challenges of LST is calibration to ensure that reported results may be used to predict real-world performance and reproducibility to ensure that results are not laboratory- or equipment-dependent. Thus, one of ordinary skill in the art would understand that an effective calibration technique, which would allow the standardization of surface velocity measurements would be useful for many applications besides determining interface strength.

The various embodiments described herein find many applications for studying and monitoring the mechanical properties of manufactured and natural systems. By way of non-limiting example, fuel plate interfaces for nuclear fuel, laminated composites, geological systems/formations, treated alloys, and in-service structural members.

Further, VISAR (velocity interferometer system for any reflector) and laser vibrometer systems for vibration and noise characterization may also be improved from a field calibration check of a velocity measurement system. A calibration check in an appropriate velocity range may ensure more accurate measurements and standardization among measurement systems, testing laboratories and manufacturers. In applications where a material yields, a calibration check may be built into a measurement.

Various embodiments of this disclosure use a material's Hugoniot elastic limit (HEL) to calibrate measurement instruments, for example, velocimetry instruments. Stress or pressure waves of sufficiently low intensity are elastic in nature, and the wave speed may be calculated from just the elastic properties of the material. As the stress intensity increases beyond the material's elastic limit, a slower plastic deformation wave separates from and lags the elastic wave resulting in a two-wave structure with an elastic precursor and a following plastic wave, the transition occurring at the HEL. The HEL manifests as a transition (or shoulder) 20, separating a fast elastic wave 21 from a slower plastic wave 22, as illustrated in FIG. 1. The transition 20 has a transition amplitude different than the amplitude of the elastic wave 21 and the plastic wave 22. Further, the HEL is where the inelastic wave catches the elastic wave, and interferes with the elastic wave.

HEL may be used to improve velocity calibration, at least in part, because it is a material property. Thus, the accuracy of the technique is, at least in part, based on the properties of the material being tested and not on the delivery mechanism or the magnitude of the energy being delivered.

FIGS. 2A, 2B and 2C illustrate the HEL velocity measurement from two measurement systems undergoing calibration according to embodiments of the disclosure. In particular, they illustrate laser-shock induced velocity measurement on a nominally 1.5 mm-thick plate of Aluminum 6061-O.

FIG. 2A is a graph showing an entirely elastic behavior produced by a laser energy of 0.12 J from two measurement systems. The HEL of the sample is not exceeded, thus, no secondary plastic wave is induced in the sample. This is illustrated in the waveform by the straight vertical leading edge of the elastic wave 24. In FIG. 1, the waveform includes a transition 20, that manifests as a "shoulder" in the waveform.

FIG. 2B shows the signature HEL discontinuities in both signals from yielding in the material for a laser energy of 0.95 J. A considerably larger shock wave was generated to obtain the data shown in FIG. 2C for a laser energy of 2.0 J. Despite the stronger shock and strain rates, the HEL velocities within each measurement system remained consistent. Notably, there is some velocity bias between the two measurement systems, which is the subject of the calibration effort. In this particular example, the bias (i.e., difference in HEL and maximum amplitudes) was caused by a low-pass filter in the velocity laser signal chain.

These results are tabulated in Table 1. Prior to calibration, the measured HEL velocities for the two laser energies within each system are self-consistent to within 1 m/s of each other while the peak velocities are separated by nearly a factor of 2. Comparing the two uncalibrated systems to one another, a large difference in the HEL is apparent. This difference is largely removed by the calibration process.

TABLE 1

Comparison of Max and HEL Velocities Prior to Calibration

| Laser Energy Power Meter (J) | System 1 Average | | System 2 Average | |
| --- | --- | --- | --- | --- |
| | Maximum Velocity (m/s) | HEL Velocity (m/s) | Maximum Velocity (m/s) | HEL Velocity (m/s) |
| 0.12 | 16 | — | 23.3 | — |
| 0.95 | 66.4 | 17.4 | 75.2 | 24.8 |
| 2.00 | 110.3 | 17.9 | 157.1 | 23.5 |

The HEL is presented, here, as a calibration benchmark for the LST and other techniques using non-contact surface velocity measurements. In the low-velocity limit, the HEL is a function of the elastic properties of the subject material and in real-world high-rate tests, the HEL increases predictably with rising strain rate. Although the HEL is rate-dependent, the loading rate up to the HEL is nearly constant for the range of laser energies of interest.

Accordingly, the embodiments of this disclosure that use an HEL as a velocity calibration tool or to monitor a material have several advantages. Since the signature response is based on material properties that are robust with respect to variable boundary conditions, the technique is flexible and cost effective. Further, it is difficult to develop, calibrate and standardize velocity measurement systems because of the vast range of applications that can use non-contacting velocity sensors. Velocity standards are difficult and expensive to implement, and tend to work better for internal comparisons than external comparisons because of the complexity of the applications and the calibration processes.

The particle (material) velocity associated with that particular stress intensity may be calculated, and an experimentally measured material velocity at the HEL may be related to the predicted value. By comparing the predicted HEL velocity and measured HEL velocity, the velocimetry system in question may be calibrated. In addition, different velocimetry systems may be aligned to one another or to a standard by repeating the method on each velocimeter with a known uniform material.

Figure 3:
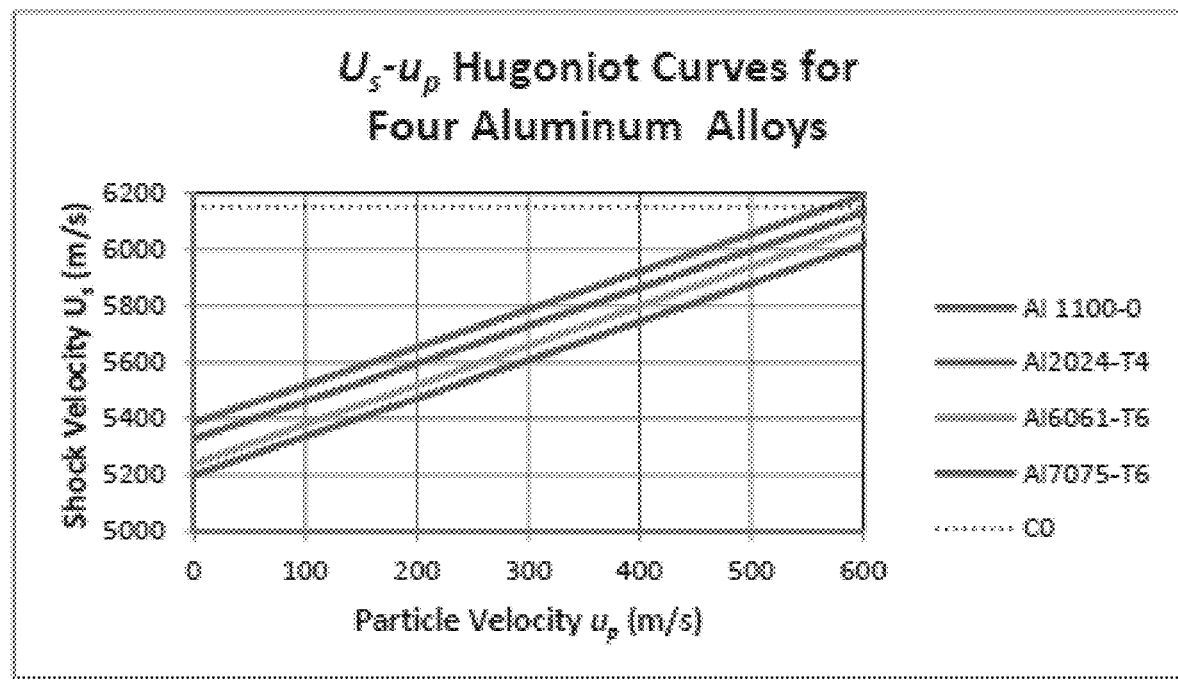
FIG. 3 is a graph showing the shock/particle velocity relationship for four aluminum alloys, in accordance with an embodiment of the disclosure.

The following is a description of using HEL that references FIG. 3 and equations 1-14, according to various embodiments of the disclosure.

Shock Wave Speed in Solids

Stress or pressure waves of sufficiently low intensity are elastic in nature, and the wave speed may be calculated from just the elastic properties of the material. For waves in an unbounded isotropic and homogeneous medium the elastic wave speed is expressed by Eq. 1:

$$C_0 = \sqrt{\frac{E(1-v)}{\rho_0(1+v)(1-2v)}} \quad (1)$$

where E is the Young's modulus, $\rho_0$ is the density, and $v$ is Poisson's ratio.

As the stress intensity increases beyond the material's elastic limit, a slower plastic deformation wave separates from and lags behind the elastic wave. This plastic wave speed is governed by the compressive stiffness, or bulk modulus K. At low stress intensity, the bulk modulus is related to Young's modulus as Eq. 2:

$$K = \frac{E}{3(1-2v)} \quad (2)$$

And the bulk wave speed is then expressed as Eq. 3:

$$C_b = \sqrt{\frac{E}{3\rho_0(1-2v)}} = \sqrt{\frac{K}{\rho_0}} \quad (3)$$

The bulk modulus is not constant but increases with increasing compression. Thus the plastic wave speed also increases with increasing intensity, eventually surpassing the elastic wave and becoming a shock. Plate-impact experiments are used to generate high intensity uniaxial strain condition measurements of the compressibility and wave speed in solids. The Shock Velocity/Particle Velocity ($U_s$-$u_p$) relationship may be used to relate wave speed to stress intensity. This relationship may be expressed using Eq. 4:

$$U_s = C_s + s_1 u_p + s_2 u_p^2 \quad (4)$$

where $U_s$ is the velocity of the stress wave, $C_s$ is the shock velocity intercept, $u_p$ is the velocity of material accelerated by the stress wave, and $s_1$ and $s_2$ are curve fit coefficients. As illustration, FIG. 3 shows the $U_s$-$u_p$ curves for four aluminum alloys in the range of stresses of interest for an LST. Across the material (particle) velocity range of interest, the stress wave speed $U_s$ is slower than the elastic wave speed $C_0$ (about 6,100 m/s for aluminum). Thus a two-wave structure with an elastic precursor and a following plastic wave takes place, the transition occurring at the HEL Hugoniot Elastic Limit (HEL)

In quasi-static tensile testing, a bar with a length much larger than its diameter is gradually loaded in tension. The testing machine is set up to preclude introduction of bending or shear stresses in the central region of the specimen. Because the surfaces of the bar are stress-free, lateral stresses are zero, and the resultant stress state is uniaxial tension. Because lateral stresses are zero, lateral strains are non-zero. The effective stress is expressed as Eq. 5:

$$\sigma_e = \frac{1}{\sqrt{2}}[(\sigma_1-\sigma_2)^2 + (\sigma_2-\sigma_3)^2 + (\sigma_3-\sigma_1)^2 + 6(\tau_{12}^2 + \tau_{12}^2 + \tau_{12}^2)]^{1/2} \quad (5)$$

which reduces to Eq. 6:

$$\sigma_e = \frac{1}{\sqrt{2}}[(\sigma_1)^2 + (-\sigma_1)^2]^{1/2} = \frac{1}{\sqrt{2}}[2\sigma_1^2]^{1/2} = \sigma_1 \quad (6)$$

And the von Mises yield criterion (for example) is expressed as Eq. 7:

$$Y_0 = \sigma_e = \sigma_1 \quad (7)$$

where the 3 σ's and 3 τ's are the principal normal and shear stresses, respectively.

By contrast, a laser shock test induces a uniaxial strain state. This state is identical to that generated in high-speed plate impact experiments, wherein a flat-faced projectile is fired from a gun into the face of a plate of the test material. In the brief moment before relaxation waves from the boundaries arrive, the material under the impact point is completely constrained laterally and strain is aligned with the direction of the induced stress wave. Under this stress state the material yields at a stress value known as the HEL, which may be related back to the von Mises yield criterion.

Total lateral strains are zero, thus the elastic component is of equal magnitude and opposite sign to the plastic component. Assuming that plastic deformation is incompressible, the axial stress ($\sigma_1$) for uniaxial strain states above the elastic limit is expressed as Eq. 8:

$$\sigma_1 = \frac{E \cdot \varepsilon_1}{3 \cdot (1-2v)} + \frac{2}{3}Y_0 = K\varepsilon_1 + \frac{2}{3}Y_0 \quad (8)$$

where K is the bulk modulus defined in (2) and $\varepsilon_1$ is the axial component of strain. To identify the value of the HEL, the special case of pure elastic strain and enforced strain continuity at the elastic limit is considered and expressed as Eq. 9:

$$\sigma_1 = \sigma_{HEL} = \frac{E \cdot \varepsilon_1}{3 \cdot (1-2v)} + \frac{2}{3}Y_0 = \frac{(1-v)}{(1-2v) \cdot (1+v)}E \cdot \varepsilon_1 \quad (9)$$

or simply expressed as Eq. 10:

$$\sigma_1 = \sigma_{HEL} = \frac{2Y_0}{3 - \frac{(1+v)}{(1-v)}} \quad (10)$$

Thus, a material's HEL is a function of the tensile yield strength ($Y_0$) and Poisson's ratio ($v$). However, the HEL is observed under conditions of dynamic impact, laser shock, or other fast-loading regimes. Strain rate dependence will modify the observed value from this quasi-static baseline value.

Rate Dependence of the HEL

Material yield strength varies with a variety of factors, including, for example, plastic work, pressure, load rate, and temperature. For the load rate effect, the Johnson-Cook elastic-plastic constitutive model is expressed as Eq. 11:

$$\sigma_y = (A + B\varepsilon_p^n)\left(1 + C\ln\frac{\dot{\varepsilon}}{\dot{\varepsilon}_{ref}}\right)(1 - T^{*m}) \quad (11)$$

with terms for initial yield (A); work hardening ($B\varepsilon_p^n$); strain rate $$\left(1 + C\ln\frac{\dot{\varepsilon}}{\dot{\varepsilon}_{ref}}\right);$$

and thermal softening ($1-T^m$). In the Johnson-Cook model, yield strength increases with the logarithm of strain rate, where $\dot{\varepsilon}$ is the strain rate, $\dot{\varepsilon}_{ref}$ is the reference strain rate, and C is a curve-fit parameter.

Multiplying the material yield stress by the Johnson-Cook rate dependence factor, and combining with the expression for the HEL results in Eq. 12:

$$\sigma_{HEL} = \frac{2Y_0\left(1 + C\ln\frac{\dot{\varepsilon}}{\dot{\varepsilon}_{ref}}\right)}{3 - \frac{(1+v)}{(1-v)}} \quad (12)$$

Eq. 12 expresses the HEL in terms of the uniaxial yield stress value and strain-rate characteristic of the laser shock induced stress wave. For example, in a specific case of Al 6061-O, rate dependence data was used to identify a rate parameter C=0.07. The data from the computational model of a laser shock test reveals a characteristic strain rate on the order of $10^5$ s$^{-1}$ producing a rate dependence factor of 1.81 for this material. Using values for $Y_0$ and v of 55 MPa and 0.33 respectively, an HEL value of 196 MPa is predicted in the laser shock tests of Al 6061-O.

The computational model described above may be used to determine the rate sensitivity of the laser shock process because the HEL is sensitive to the rate of strain (or loading) by the stress wave. For example, simulations were performed with a range of laser energies to produce back-surface velocities of 25, 50, and 100 m/s in an Al 6061-O plate. The stress rates in the center of the plate were measured in the stress range up to the HEL. Over the factor of four difference in peak stress intensities, the stress rate varied by only 23%, translating to a 2 MPa (1%) variation in the calculated HEL over the stress range of interest.

Extraction of the HEL

The intensity of the stress wave in the body of the plate is related to the material velocity behind it by Eq. 13:

$$\sigma = \rho_0 U_s u_p \quad (13)$$

where $U_s$ is the velocity of the stress wave and $u_p$ is the induced particle velocity. At the free surface of the plate where the material velocity may be measured, the interaction of the positive incident wave and negative reflected wave has the effect of cancelling the surface stress (stress at a free surface is always 0), and doubling the material velocity.

Denoting the surface material velocity as $u_{ps}$ and substituting eq. (4) for the wave speed $U_s$, the result is expressed by Eq. 14:

$$\sigma = \rho_0\left[C_s + \frac{s_1 u_{ps}}{2} + \frac{s_2 u_{ps}^2}{4}\right]\frac{u_{ps}}{2}. \quad (14)$$

The HEL material velocity may then be picked from the trace of the plate back face velocity such as that shown in FIG. 1. The HEL manifests as a transition (or shoulder) separating the fast elastic wave 21 from the slower plastic wave 22 (see FIG. 1). The HEL appears at a back-face velocity of approximately 24.8 m/s. Using this value for $u_{ps}$ and material values for Al 6061-O cited above ($s_1$=1.4, $s_2$=0), $\sigma_{HEL}$=176 MPa.

The following descriptions are of techniques that use HEL to calibrate velocimetry systems as well as to monitor mechanical properties of materials, according to embodiments of the disclosure.

Figure 4:
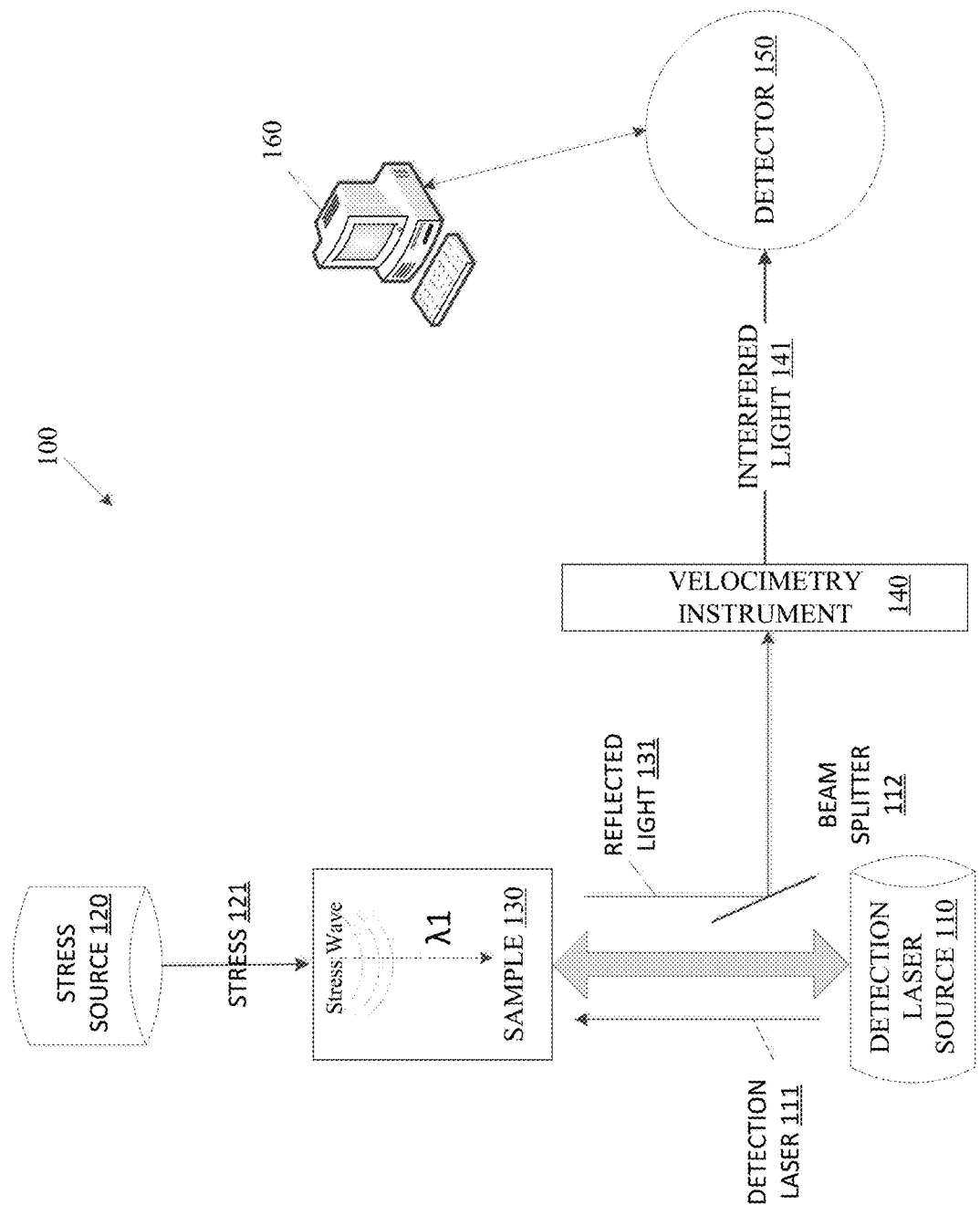
FIG. 4 shows a block diagram of a non-contact velocity measurement system with the stress source and detection source arranged on opposite sides of the sample, in accordance with an embodiment of the disclosure.

FIG. 4 illustrates a system 100, according to an embodiment of the disclosure. In various embodiments, the system 100 may be used for calibrating a velocimetry instrument 140 and/or monitoring materials or samples using a velocimetry system. The system 100 may include a detection laser source 110, a stress source 120, a sample 130, a velocimetry instrument 140 and a detector 150.

The sample 130 may be any material undergoing velocity measurement, for example, rocks, metals, polymers, composites, and combinations thereof. The sample 130 may also be an industrial item or other item of manufacture, for example, fuel (including without limitation solid, and nuclear), semiconductors, ceramic, plastics, mechanical structures, laminates, and combinations thereof. For calibration purposes, some embodiments of the sample 130 may be a monolithic specimen, for example, a single-layer plate such as Al 6061-O.

The stress source 120 may be any suitable source that can generate shock energies that produce velocities within the operational range of the operation of the velocimetry instrument 140. In one embodiment, the stress source 120 may be a shock wave laser such as a Q-switched neodymium-doped yttrium aluminum garnet (Nd:YAG) laser. The laser may be configured, for example, to generate optical pulses of about 10 ns with a maximum energy of 3.5 J at 1064 nm wavelength. In one embodiment, the stress source 120 may be configured to generate multiple laser shock energies, for example, 0.12, 0.95 and 2.0 J for an irradiated fuel plate. In one embodiment, the energies may be selected to generate an entirely elastic surface motion, a moderate shock front and a significant shock front. The amount of energy absorbed by the material depends on the material and the surface conditions. Thus, the choice of the stress power may be defined by how much energy needs to absorbed to generate the desired back surface velocity.

In another embodiment, the number of shots or bursts of each energy level and a measurement criteria (e.g., HEL average measurement) may also be selected to determine the HEL velocity measurement.

One of ordinary skill in the art will understand that the scope of the disclosure is not limited to lasers, but may include other energy sources that will induce shock waves for interrogating the front surface of materials and substrates. The wave may be induced by different means than a laser, for example, acoustic, projectile, explosion, hammer, plate impact, eddy current, Piezo electric elements, and electromagnetic (RF, THz) sources.

In various embodiments, additional characteristics may be configured including, for example, spot diameter and beam spatial profile (e.g., top hat, Gaussian, etc.). However, these characteristics may not be consequential to the HEL measurement and calibration of the velocimetry instrument 140 and are not required.

The detection laser source 110 may be any suitable laser for interrogating the sample 130 while undergoing shock energies. In one embodiment, the detection laser source 110 is a long pulse (>120 µs) Nd:YAG velocimeter laser, although it may be any long coherent length laser, pulsed or continuous wave (CW). In one embodiment, the power required by the detection laser source 110 may be determined responsive to the reflectivity of the material being interrogated. Reflectivity is determined by the material and the surface condition. For example, a high reflectivity material will require a less powerful laser than a low reflectivity material. In one embodiment, the laser may be configured to operate, for example, at 1064 nm wavelength to interrogate a clad fuel foil.

It should be noted that the detection laser source 110 is arranged opposite the stress source 120, in FIG. 4, but the system 300 is not limited to this arrangement. In various embodiments, the stress 121 induces the shock wave $\lambda_1$ at a first side of the sample 130, and the shock wave $\lambda_1$ propagates across the sample 130 to the spot where a detection laser 111 is interrogating the sample 130. A reflected light 131 is indicative of the surface velocity of the sample 130, and travels through a beam splitter 112, and split beams travel into the velocimetry instrument 140. In various embodiments, the reflected light 131 may travel along a path substantially the same as the detection laser 111, and enter an aperture (not shown) at the detection laser 111 before entering the beam splitter 112.

The velocimetry instrument 140 may be any velocimeter type measurement device suitable for non-contact velocity measurement. In one embodiment, the velocimetry instrument 140 is an optical velocimeter based on a solid Fabry-Perot etalon and the velocity is the measure of resulting input energy. In another embodiment, the velocimetry instrument 140 may be a Michaelson interferometer, a time delay interferometers, an interferometer made from acoustics, electromagnetic and radiation emissions. In various embodiments, the laser-based velocimetry system may include a Fabry-Perot interferometer, a laser Doppler velocimeter, or a VISAR.

The detector 150 may be any detector suitable for capturing the interfered light 141 generated by the velocimetry instrument 140. The type of detector 150 may depend on the type of non-contact velocity measurement. For example, the detector 150 may be a photodiode, camera, or other means for converting the interfered light into signals for a computer.

In various embodiments, the system 100 may be coupled to a computer system 160. In one embodiment, the computer system 160 may be a workstation executing software to configure, control, and receive data from one or more of the stress source 120, detection laser source 110, sample 130, velocimetry instrument 140 and detector 150. The workstation may be further configured to receive measurement and other data from the system 100, for example, velocity measurements. In one embodiment, the computer system 160 may be configured to generate and store, with or without user interaction, configuration parameters for the system 100, including responsive to one or more velocity measurements.

In various embodiments, the sample 130 may be prepared for use with the system 100. Preparing the sample 130 may help increase efficiency of the generated shock wave. FIGS. 5A and 5B illustrate a sample 130 prepared according to an embodiment of the disclosure. In this embodiment, the sample 130 comprises aluminum cladding 135 surrounding uranium sample 136. A constraining mechanism 132 is positioned on the outer surface of an aluminum cladding 135 that would otherwise be in the path of a stress 121. The constraining mechanism 132 increases the pressure pulse time duration that generates the shock wave caused/induced by the stress 121.

In one embodiment, the constraining mechanism 132 may comprise a containment layer 133 and an absorption layer 134, as illustrated in FIG. 5B. The absorption layer 134 absorbs the energy from the stress 121 and plasma is created. The containment layer 133 contains the plasma and increases the pressure pulse time duration and amplitude. The containment layer 133 may also contain gasses and molten materials, which may provide a more hospitable environment for the delivery optics. The absorption layer 134 may be formed from any material suitable for creating the plasma, for example, black electrical tape. The containment layer 133 may be formed from any suitable material for containing the plasma, for example, water, transparent polyurethane or clear tape.

Figure 6:
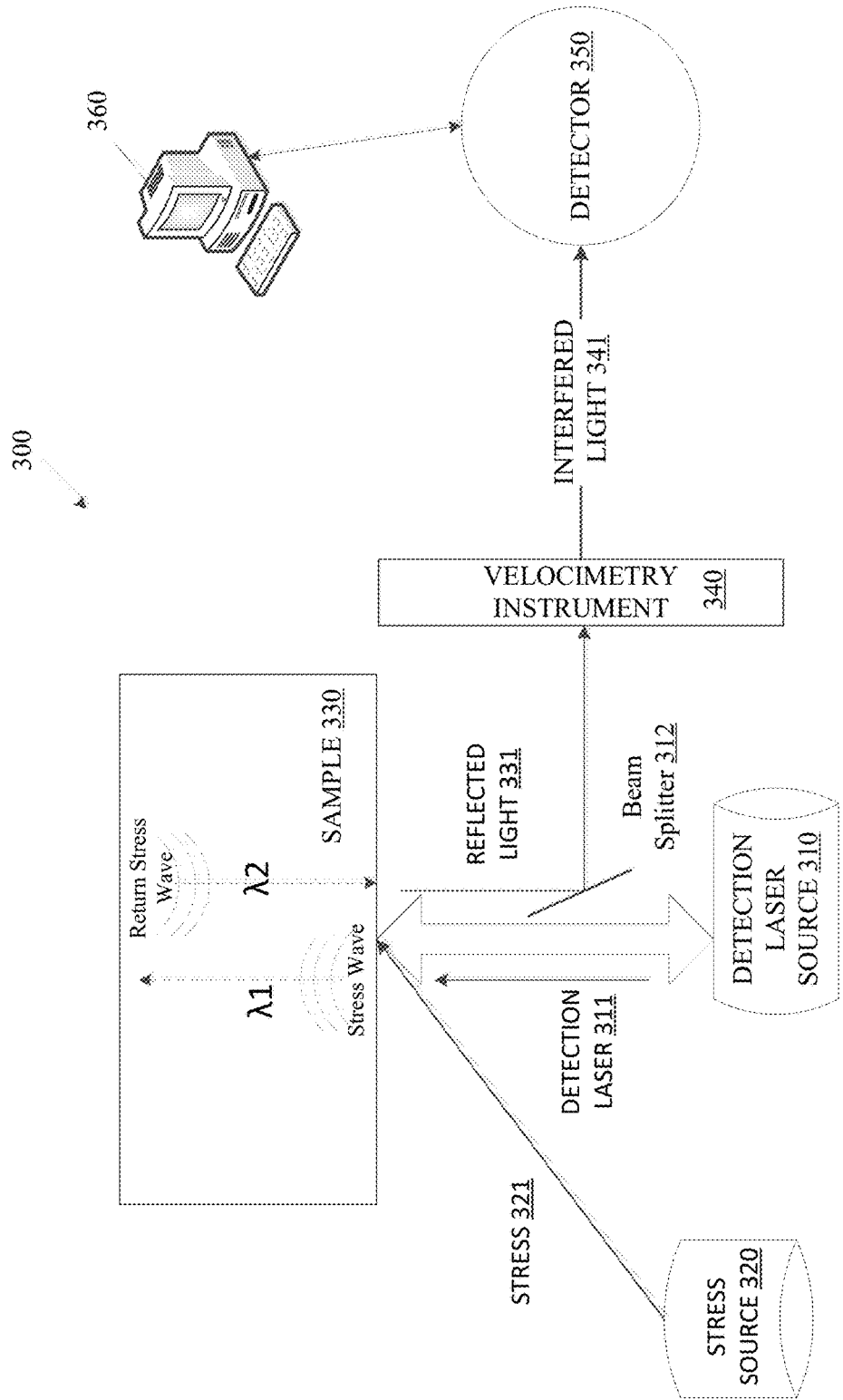
FIG. 6 shows a block diagram of a non-contact velocity measurement system with the stress source and detection source arranged on the same side of the sample, in accordance with an embodiment of the disclosure.

FIG. 6 illustrates a system 300, according to an embodiment of the disclosure. In various embodiments, the system 300 may be used for calibrating a velocimetry instrument and/or monitoring materials or samples using a velocimetry system. The system 300 may include a detection laser source 310, a stress source 320, a sample 330, a velocimetry instrument 340, and a detector 350. In one embodiment, the system 300 may include a computer system 360, for example, a workstation executing software to configure, control, and receive data from one or more of the stress source 320, detection laser source 310, sample 330, velocimetry instrument 340 and detector 350. The computer system 360 may be configured to generate and store, with or without user interaction, configuration parameters for the system 300, including responsive to one or more velocity measurements.

The system 300 may be particularly suitable for monitoring applications, though it is not so limited. The system 300 is similar to the system 100 shown in FIG. 4, however, the stress source 320 and detection laser source 310 are arranged on the same side of the sample 330. The stress source 320 is configured to induce a shock wave via a stress 321 at the same spot, or substantially the same spot, that a detection laser 311 interrogates the sample 330. The detection laser 311 interrogates the sample 330 as it is affected by the return stress wave $\lambda_2$ that is created from the induced shock wave $\lambda_1$ reflecting from the opposite surface of the sample 330. A reflected light 331 is indicative of the velocity of the surface of the sample 330 caused by the return stress wave $\lambda_2$. In various embodiments, the reflected light 331 may travel along a path substantially the same as the detection laser 311, and enter an aperture (not shown) at the detection laser 311 before entering the beam splitter 312.

The velocimetry instrument 340 may be any velocimeter type measurement device suitable for non-contact velocity measurement. In one embodiment, the velocimetry instrument 340 is an optical velocimeter based on a solid Fabry-Perot etalon and the velocity is the measure of resulting input energy. In another embodiment, the velocimetry instrument 340 may be a Michaelson interferometer, a time delay interferometers, an interferometer made from acoustics, electromagnetic and radiation emissions. In various embodiments, the laser-based velocimetry system may include a Fabry-Perot interferometer, a laser Doppler velocimeter, or a VISAR.

The detector 350 may be any detector suitable for capturing the interfered light 341 generated by the velocimetry instrument 340. The type of detector 350 may depend on the type of non-contact velocity measurement. For example, the detector 350 may be a photodiode, camera, or other means for converting the interfered light into signals for a computer.

Figure 7:
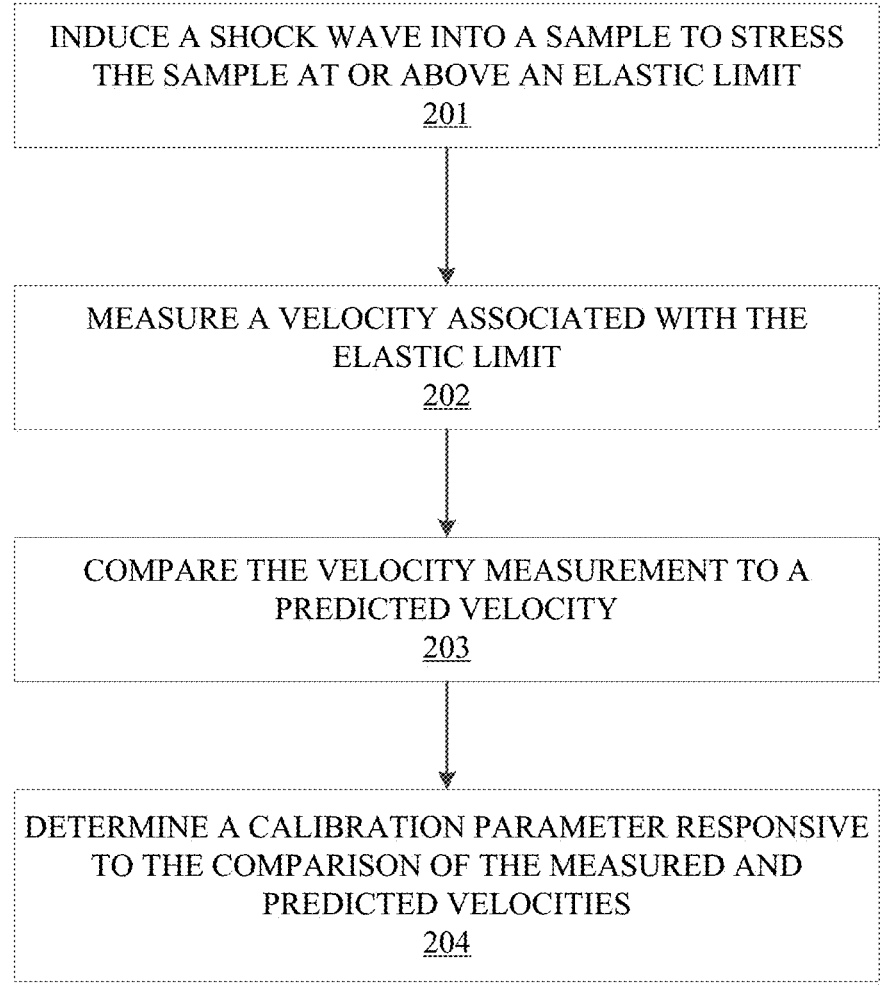
FIG. 7 shows a flowchart of a calibration method, in accordance with an embodiment of the disclosure.

FIG. 7 illustrates a method of calibrating velocimetry measurement system, according to an embodiment of the disclosure. A shock wave is induced into a sample to stress the sample at or above an elastic limit, in operation 201. In one embodiment, the elastic limit is an elastic-plastic state that is the sample's HEL. A velocity measurement is associated with the elastic limit, in operation 202. In one embodiment, the velocity is associated with an HEL stress intensity. The velocity measurement is compared to a predicted velocity (e.g., prior benchmarked measurements for the same material), in operation 203, for example, to determine a difference. Calibration parameters are determined responsive to the comparison of the measured and predicted velocities, in operation 204. The measurement system may be calibrated using the calibration parameters.

FIG. 8 illustrates a method of calibrating velocimetry measurement system, according to another embodiment of the disclosure. A shock wave is induced into a sample to stress the sample at or above an elastic limit, in operation 211. In one embodiment, the elastic limit is an elastic-plastic state transition that is the sample's HEL. A velocity associated with the elastic limit is measured by a first measurement system, in operation 212. In one embodiment, the velocity is associated with an HEL stress intensity. The measured velocity is compared to a second velocity measured by a second measurement system, in operation 213, for example, to determine a difference. Calibration parameters (e.g., for a velocimetry system) are determined for the first measurement system responsive to the comparison of the measured velocities, in operation 214. Calibration parameters (e.g., for a velocimetry system) are determined for the second measurement system responsive to the comparison of the measured velocities, in operation 215. The first and second measurement system may be calibrated using to the calibration parameters.

In one embodiment, the second measurement system may be a standardized measurement system, for example, a golden system that uses HEL or a velocity calibration standard such as a rotating wheel.

In one embodiment, the predicted velocity measurement and/or the second velocity measurement may be in the form of a velocity function. The calibration parameter may be a fit function to map the measured velocity to the predicted velocity and/or the second velocity measurement. The fit function may then be used to adjust velocity measurements to arrive at adjusted or corrected velocity measurements.

Materials may be characterized, including those operating in harsh environments such as high temperature, radiation, impact (work hardening), tempering, fatigue, etc., in accordance with embodiments of the disclosure. For example, the HEL may be used to characterize microstructure evolution in a non-contact manner in situ within harsh environments. In this manner, the HEL measurement may be used in a manner analogous to a Vickers or Rockwell hardness test, without a hardness testers susceptibility to damage in a tempering oven, a nuclear reactor or in situ.

Figure 9:
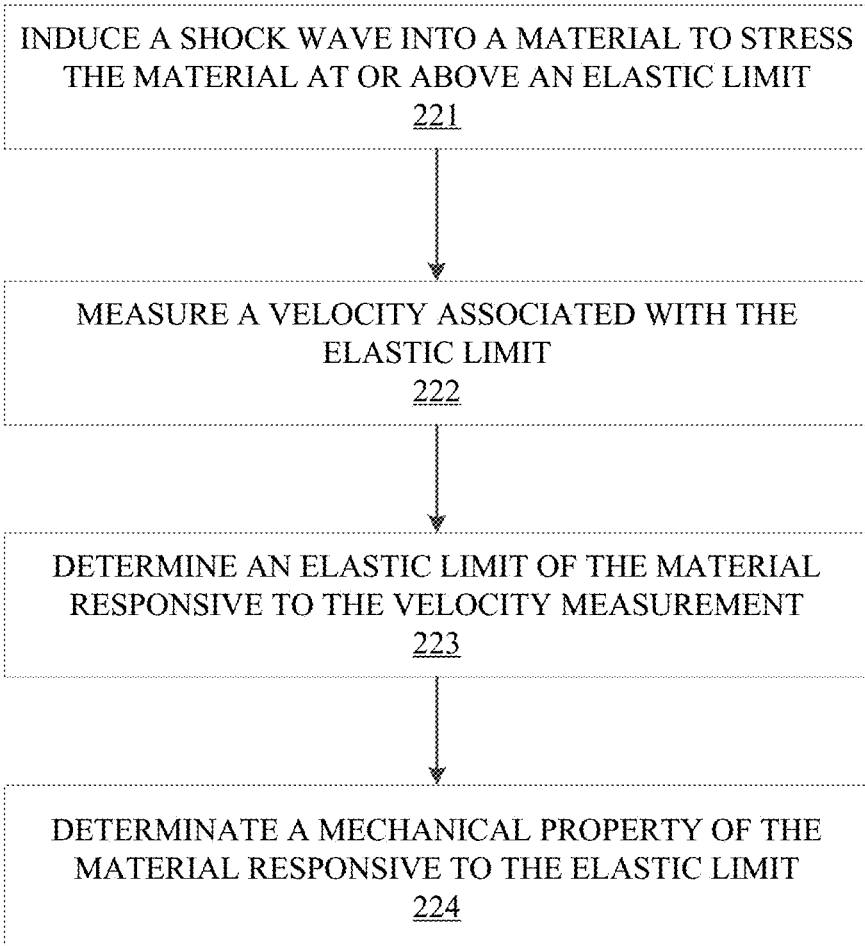
FIG. 9 shows a flowchart of a monitoring method, in accordance with an embodiment of the disclosure.

FIG. 9 illustrates a method of monitoring a material with a velocimetry system in accordance with an embodiment of the disclosure. A shock wave is induced into a material to stress the material at or above an elastic limit, in operation 221. In one embodiment, the elastic limit is an elastic-plastic state transition that is the sample's HEL. A velocity is measured that is associated with the elastic limit, in operation 222. In one embodiment, the velocity is associated with an HEL stress intensity. A change in the elastic limit of the material is determined responsive to the measured velocity, in operation 223. In one embodiment, the change is determined responsive to a difference between the measured velocity and prior velocity measurement, where their difference is indicative of a different HEL for the material. A change in a mechanical property of the material is determined responsive to the change in the elastic limit, in operation 224. In various embodiments, the mechanical property may be hardness, stiffness, elasticity, malleability, tensile strength, compressive strength, and combinations thereof.

Figure 10:
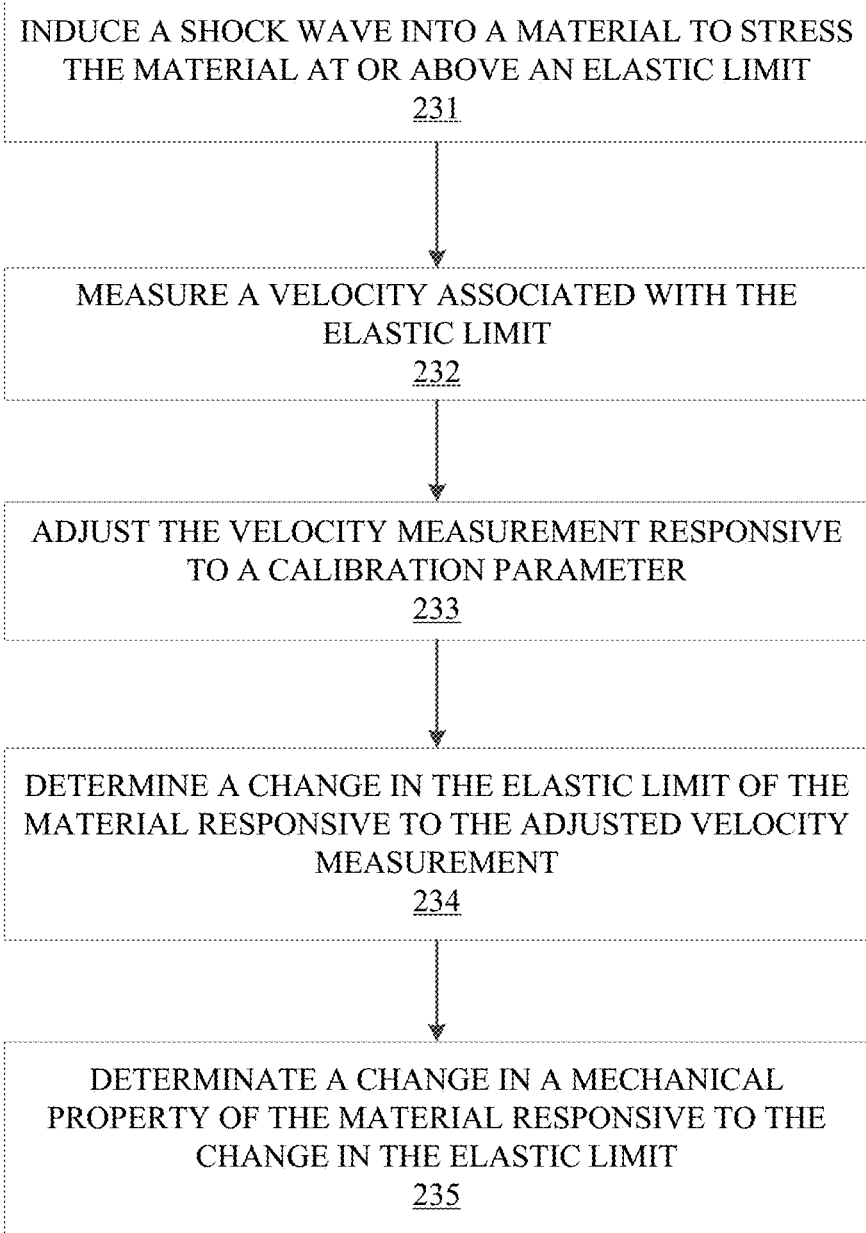
FIG. 10 shows a flowchart of a monitoring method, in accordance with an embodiment of the disclosure.

FIG. 10 illustrates a method of monitoring a material with a non-contact velocity measurement system in accordance with an embodiment of the disclosure. A shock wave is induced into a material to stress the material at or above an elastic limit, in operation 231. In one embodiment, the elastic limit is an elastic-plastic state transition that is the sample's HEL. A velocity is measured that is associated with the elastic limit, in operation 232. In one embodiment, the velocity is associated with an HEL stress intensity. The measured velocity is adjusted responsive to a calibration parameter associated with the material, in operation 233. In one embodiment, the calibration material is one or more of a fit function or an operational parameter of a velocimetry instrument. A change in the elastic limit of the material is determined responsive to the adjusted measured velocity, in operation 234. In one embodiment, the change is determined responsive to a difference between the measured velocity and prior velocity measurement, where there difference is indicative of a different HEL for the material. A change in a mechanical property of the material is determined responsive to the change in the elastic limit, in operation 235. In various embodiments, the mechanical property may be hardness, stiffness, elasticity, malleability, tensile strength, compressive strength, and combinations thereof.

Figure 11:
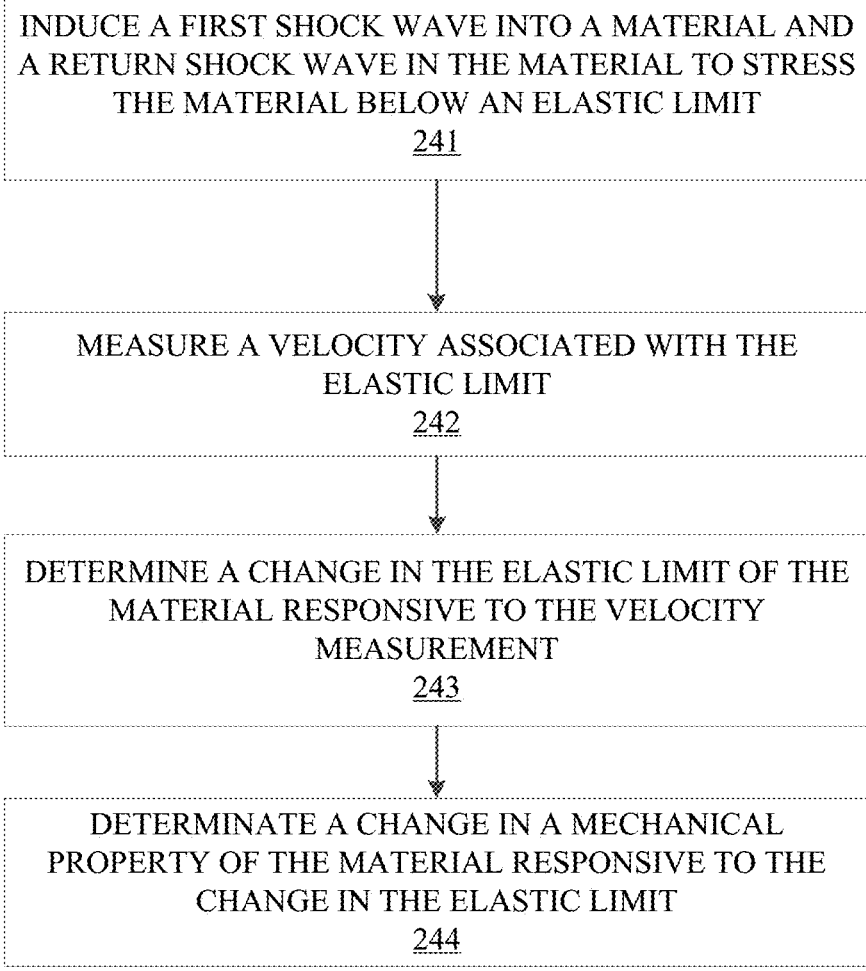
FIG. 11 shows a flowchart of a monitoring method, in accordance with an embodiment of the disclosure.

FIG. 11 illustrates a method of monitoring a material with a non-contact velocity measurement system in accordance with an embodiment of the disclosure. A shock wave is induced into a material to stress the material at or above an elastic limit, in operation 241. In one embodiment, the elastic limit is an elastic-plastic state transition that is the sample's HEL. A velocity is measured associated with the elastic limit, in operation 242. In one embodiment, the velocity is associated with an HEL stress intensity. A change in the elastic limit of the material is determined responsive to the measured velocity, in operation 243. In one embodiment, the change is determined responsive to a difference between the measured velocity and prior velocity measurement, where there difference is indicative of a different HEL for the material. A change in a mechanical property of the material is determined responsive to the change in the elastic limit, in operation 244. In various embodiments, the mechanical property may be hardness, stiffness, elasticity, malleability, tensile strength, compressive strength, and combinations thereof.

The features of the various embodiments described herein are not mutually exclusive and can exist in various combinations and permutations, even if such combinations or permutations are not expressly described herein, without departing from the scope of the disclosure. In fact, variations, modifications, and other implementations of what is described herein will occur to one of ordinary skill in the art without departing from the scope of the disclosure. As such, the invention is not to be defined only by the preceding illustrative description, but only by the claims which follow, and legal equivalents thereof.

We claim:

1. A method comprising:
   inducing a wave into a sample to stress the sample at or above an elastic limit;
   measuring a particle velocity while the sample is stressed at or above the elastic limit;
   comparing the measured particle velocity to a predicted velocity; and
   determining one or more calibration parameters responsive to the comparison.

2. The method of claim 1, wherein the elastic limit is substantially at an elastic-plastic state transition of the sample.

3. The method of claim 1, wherein the elastic limit is a Hugoniot elastic limit of the sample.

4. The method of claim 1, wherein measuring the particle velocity associated with the elastic limit comprises measuring by a velocimetry system.

5. The method of claim 4, wherein the velocimetry system is one of a laser-based system, a Fabry-Perot interferometer, and Doppler velocimeter.

6. The method of claim 1, further comprising calibrating a measurement system responsive to the comparison.

7. The method of claim 1, wherein at least one of the one or more calibration parameters comprises a fit function.

8. The method of claim 1, wherein the wave is induced in a manner selected from the group consisting of a laser, projectile, explosion, hammer, and plate impact.

9. A method comprising:
   inducing a wave into a sample to stress the sample at or above an elastic limit;
   measuring a particle velocity while the sample is stressed at or above the elastic limit by a first measurement system;
   comparing the measured particle velocity to a second particle velocity measured by a second measurement system; and
   determining one or more calibration parameters for the first measurement system responsive to the comparison.

10. The method of claim 9, further comprising:
    determining one or more calibration parameters for the second measurement system responsive to the comparison.

11. The method of claim 9, further comprising:
    inducing a second wave into a second sample to stress the second sample at or above an elastic limit; and
    measuring the second particle velocity while the second sample is stressed at or above the elastic limit by the second measurement system.

12. The method of claim 9, wherein the elastic limit is substantially at an elastic-plastic state transition of a wave propagating in the sample.

13. The method of claim 9, wherein the elastic limit is a Hugoniot elastic limit of the sample.

14. The method of claim 9, wherein the first measurement system and the second measurement system are velocimetry measurement systems.

15. The method of claim 9, the second measurement system is a standardized velocimetry system and the first measurement system is aligned with the second measurement system.

16. A system, comprising:
    a stress generation source configured to induce a stress on a sample at or above an elastic limit of the sample;
    a non-contact measurement instrument configured to:
    obtain a first particle velocity measurement by measuring a particle velocity of the sample as it is stressed at or above the elastic limit of the sample;
    compare the first particle velocity measurement to a second particle velocity measurement; and
    determine one or more calibration parameters responsive to the comparison.

17. The system of claim 16, wherein the elastic limit is substantially at an elastic-plastic state transition of a wave propagating in the sample.

18. The system of claim 16, wherein the elastic limit is the Hugoniot elastic limit of the sample.

19. The system of claim 16, wherein the second particle velocity measurement is a predicted measurement value, or a velocity measurement based on a measurement by a second non-contact measurement instrument.

20. The system of claim 16, wherein measuring the particle velocity of the sample comprises measuring a time-varying stress field within the sample.

21. The system of claim 20, wherein measuring the time-varying stress field within the sample comprises measuring the particle velocity at a free surface of the sample.

22. The system of claim 16, wherein the non-contact measurement instrument is configured to generate a laser to interrogate the sample, and the stress generation source is arranged to induce a shock wave at substantially a same location on the sample as the laser interrogates the sample.

23. The system of claim 16, wherein the non-contact measurement instrument is configured to generate a laser to interrogate the sample, and the stress generation source is arranged relative to the sample to induce a shock wave at a first location on the sample and the non-contact measurement instrument is arranged relative to the sample to interrogate the sample at a second location on the sample, wherein the first location and the second location are on opposite sides of the sample.

24. A method comprising:
    inducing a wave into a sample to stress the sample at or above an elastic limit;
    measuring a particle velocity while the sample is stressed at or above the elastic limit by a first measurement system;
    determining an elastic limit of a material responsive to the measured particle velocity;
    determining a mechanical property of the material responsive to the determined elastic limit; and
    determining a change in the mechanical property of the material responsive to a change in a Hugoniot elastic limit.

25. The method of claim 24, further comprising determining a change in the mechanical property of the material responsive to the determined elastic limit.

26. The method of claim 24, further comprising adjusting the measured particle velocity responsive to a calibration parameter.

27. The method of claim 26, wherein the calibration parameter comprises one or more of a fit function and operating parameters of the first measurement system.

28. The method of claim 24, wherein the elastic limit is a transition phase of the wave, the transition phase comprising an inelastic wave interfering with an elastic wave.

29. A system, comprising:
a sample; and
a monitoring system configured to monitor the sample by:
  inducing a wave into the sample to stress the sample at or above an elastic limit;
  measuring a particle velocity while the sample is stressed at or above the elastic limit by a measurement system;
  determining an elastic limit of a material responsive to the measured particle velocity;
  determining a mechanical property of the material responsive to the determined elastic limit; and
  determining a change in the mechanical property of the material responsive to a change in a Hugoniot elastic limit.

30. The system of claim 29, wherein the monitoring system is configured to monitor microstructures.

31. The system of claim 29, wherein the monitoring system is configured to characterize materials undergoing one or more of high temperature, radiation fields, work hardening, tempering, fatigue.

32. The system of claim 29, wherein the monitoring system is configured to perform hardness testing.

* * * * *

UNITED STATES PATENT AND TRADEMARK OFFICE
CERTIFICATE OF CORRECTION

PATENT NO. : 10,620,100 B2  
APPLICATION NO. : 15/659396  
DATED : April 14, 2020  
INVENTOR(S) : Jeffrey M. Lacy and James A. Smith Page 1 of 1

It is certified that error appears in the above-identified patent and that said Letters Patent is hereby corrected as shown below:

In the Specification

Column 9, Line 60, change "at the HEL" to --at the HEL.--

Signed and Sealed this  
Seventh Day of July, 2020

Andrei Iancu  
*Director of the United States Patent and Trademark Office*